Oct. 13, 1970 U. HALLER ET AL 3,534,330

DATA TRANSMISSION SYSTEM

Filed Aug. 26, 1966 6 Sheets-Sheet 1

INVENTORS
Ulrich Haller &
Horst Ohnsorge

BY Spencer & Kaye
ATTORNEYS

INVENTORS
Ulrich Haller &
Horst Ohnsorge

BY Spencer & Kaye
ATTORNEYS

INVENTORS
Ulrich Haller &
Horst Ohnsorge
BY Spencer & Kaye
ATTORNEYS

INVENTORS
Ulrich Haller &
Horst Ohnsorge

BY Spencer & Kaye
ATTORNEYS

INVENTORS
Ulrich Haller &
Horst Ohnsorge
BY Spencer & Kaye
ATTORNEYS

INVENTORS
Ulrich Haller &
Horst Ohnsorge
BY Spencer & Kaye
ATTORNEYS

United States Patent Office 3,534,330

Patented Oct. 13, 1970

3,534,330

DATA TRANSMISSION SYSTEM

Ulrich Haller and Horst Ohnsorge, Ulm (Danube), Germany, assignors to Telefunken Patentverwertungsgesellschaft m.b.H., Ulm (Danube), Germany Filed Aug. 26, 1966, Ser. No. 575,293
Claims priority, application Germany, Aug. 28, 1965, T 29,297
Int. Cl. G08c 25/02; H04l 1/10, 1/16
U.S. Cl. 340—146.1 19 Claims

ABSTRACT OF THE DISCLOSURE

A data transmission error detection and correction system and method involves the use of check signals to detect the presence of errors at the receiver, sending correct and incorrect verification signals back to the transmitter, retransmitting data at the transmitter with a low redundancy check signal if an incorrect verification signal is received, and with a high redundancy check signal if the transmitter receives a conditional verification signal which corresponds to neither the correct nor incorrect verification signal, storing at the receiver retransmitted data containing low redundancy signals, and suppressing at the receiver signals containing high redundancy signals if the initial signal was correctly received initially, but storing them if the initial signal was incorrectly received.

The present invention relates to a data transmission system. More particularly, the present invention relates to a data transmission system wherein information signals are transmitted to a receiver together with check signals for indicating correct or incorrect receipt of the transmitted information.

In order to safeguard the transmission of information in data transmission systems, redundant codes are sometimes used. In such cases, the information is split up into individual blocks of information. In each of the blocks, information bits as well as redundant bits used as check signals are transmitted. The transmitting and receiving elements of the system are provided with coding arrangements for recognizing the difference between the information bits and the redundant bits. By means of these redundant bits, the data receiver can determine whether the block of information has been correctly or incorrectly received.

When the receiver determines that the check signals in a block of information corresponding to the redundant bits has been correctly received, it will generate a verification signal for indicating correct reception of the transmitted information. The generation of an incorrect or false verification signal will bring about a repetition or retransmission of the data which had been incorrectly received in the receiver portion of the data transmission system.

The verification signals are transmitted from the receiver in a backward channel to the transmitter and are generally in the form of YES-NO signals. The probability exists that these signals may also be distorted or incorrectly received at the transmitter for the same reason that the information signals could be incorrectly received at the receiver. That is, the verification signals are transmitted through a similar type of transmission channel in the reverse direction from the originally transmitted data and check bits. The incorrect reception of the verification signals at the transmitter end can result in the loss of information or require double transmission of information which has already been correctly received. Accordingly, it is necessary to protect the transmission of the verification signals in some manner.

Some systems have been developed wherein the check signals are of the YES-NO type and a large number of individual signals are combined. In this way, the check signals have increased redundancy. However, this is limited by the capacity of the transmission channel, that is, by the bandwidth of the channel for transmitting the information back from the receiver to the transmitter. The increase in the redundancy of the signals takes up channel capacity which might not be available without decreasing the time of the information transmission.

Another known method is to treat each mutilated or distorted verification signal received at the transmitter end as an indication of incorrect reception at the receiver end. Such an arrangement is shown in the German published patent application (Auslegeschrift) No. 1,170,460. With this arrangement, each block of information which is sent from the data transmitter to the data receiver must have additional control signals therein in order to indicate to the receiver whether the block of information now being received is new information or information that has been repeated. In order to properly safeguard such a system, additional control signals are required whereby the time required for transmitting the information is substantially increased.

Accordingly, it is an object of the present invention to provide a new and improved method and apparatus for the transmission of data information.

A second object of the present invention is to provide a new and improved method and apparatus for data transmission providing the substantial protection for the verification signals produced in the receiver.

Another object of the present invention is to provide a new and improved method and apparatus for data transmission using the smallest possible number of redundant signals for verification control signals.

A further object of the present invention is to provide a new and improved method and apparatus for data transmission having a very high speed of transmission of data.

With the above objects in mind, the present invention mainly consists of a data transmission system having a transmitting portion and a receiving portion for transmitting and respectively receiving information signals. Additional control signals are provided adjacent the information signals for the purpose of verifying the correct or incorrect receipt of the transmitted information at the receiver end. A verification receiver is provided at the transmission portion of the system which is capable of differentiating between correct verification signals, incorrect verification signals and conditional verification signals. Means responsive to a conditional verification are provided at the transmission end for initiating retransmission of the information signals by means of preselected high redundant control signals. Means are also provided at the transmitter portion of the system responsive to incorrect verification signals for initiating retransmission of the information signals with a low redundant control signal.

The principles of the present invention may also be practiced by a new and improved method which includes providing additional control signals next to the information signals transmitted between the transmitter and receiver portions of the data transmission system, the control signals being used for verifying whether the information signals transmitted have been correctly or incorrectly received at the receiver. The method includes differentiating at the transmitting end between correct verification signals, incorrect verification signals and conditional verification signals. Retransmission of the data using a preselected high redundant control signal is initiated upon the reception of a conditional verification at the transmitter. Initiation of retransmission of the information signals either without any control signals or by means of a control signal having a low degree of redundancy is initiated by the reception of incorrect verification at the transmitter end.

Additional objects and advantages of the present invention will become apparent upon consideration of the following description when taken in conjunction with the accompanying drawings in which.

Figure 1:
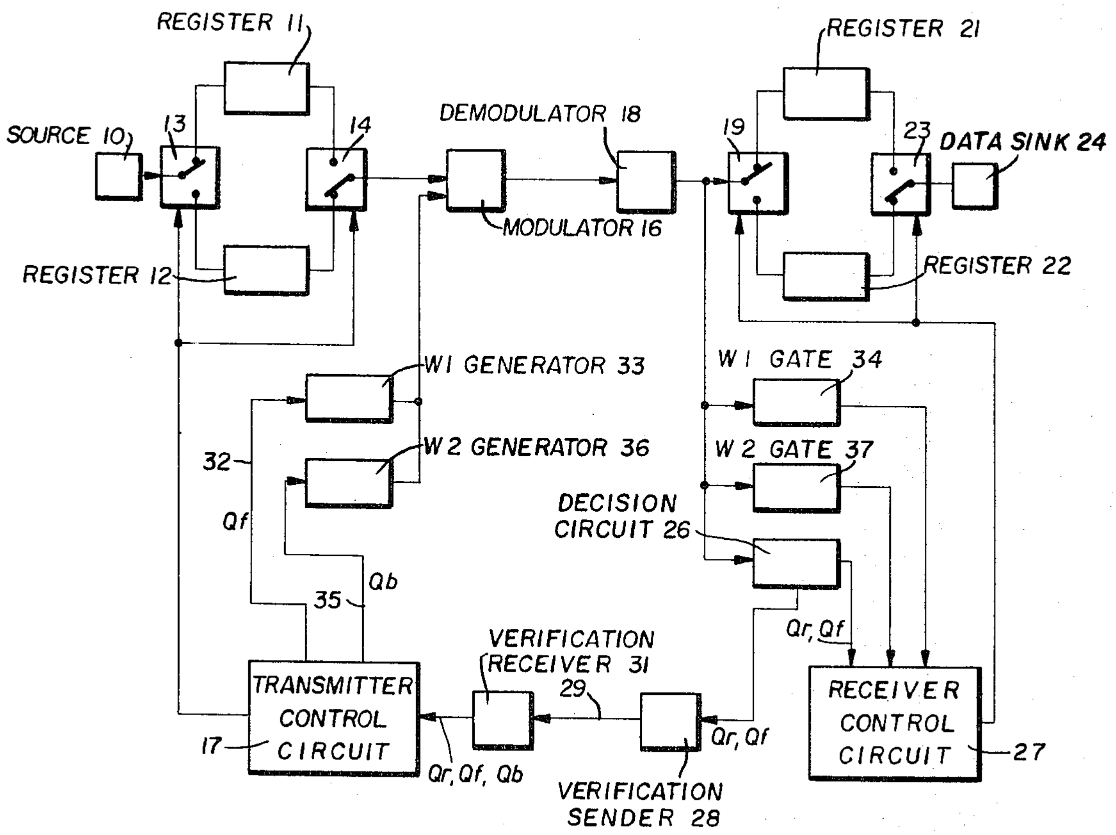
FIG. 1 is a block diagram of a data transmission system incorporating the principles of the present invention.

Referring to the drawings, the block diagram of FIG. 1 shows a transmitter at the left hand portion of FIG. 1 and a receiver at the right hand portion. FIGS. 1 and 2 relate to an alternating pulsing system of the type described in the publication L'Ond Electrique entitled "Système Synchrone de Transmission Rapide d'Informations," February 1963, pp. 186–198.

In FIG. 1, a source 10 provides data generally in the form of binary information to the registers 11 and 12. The data is fed in blocks alternately to the registers 11 and 12 by changes in the position of the switch 13.

The outputs from the registers 11 and 12 are applied alternately in data blocks by means of a switch 14 to a modulator 16. It can be seen that the positions of the switches 13 and 14 are controlled by a transmitter control circuit 17 connected to both switches.

In the system of FIG. 1, the data is transmitted in the form of blocks of information. Thus, each of the registers 11 and 12 stores a complete block of information prior to applying the same to the modulator 16. Each block contains bits of data information as well as bits serving as check signals.

The modulated signals are received at the receiver and demodulated by the demodulator 18. The output from the demodulator 18 is applied by means of a switch 19 to registers 21 and 22 which are the equivalent of the registers 11 and 12 in the transmitter. In the event the transmission of information from the transmitter to the receiver has been free of errors, the received data blocks will be applied, through the switch 23, to the data sink 24.

However, before this can occur, the receiver must first check that the transmitted data has been correctly received. This is accomplished in the first instance in the receiver by the decision circuit 26. It can be seen that the data received from the demodulator 18 is applied to the input of the decision circuit 26. The circuit 26 generates verification signals. The correct verification signal $Qr$ or the incorrect verification signal $Qf$ is applied to the receiver control circuit 27 and is also applied to the verification sender circuit 28.

It can be seen that the receiver control circuit 27 controls the operation of the positions of the switches 19 and 23 in the receiver. Thus, by placing the switches 19 and 23 in a neutral position wherein the registers 21 and 22 are not connected in the circuit, the receiver control circuit 27 can prevent information from reaching the data sink 24, when desired.

The verification sender 28 in the receiver sends the verification signal information by means of a backward channel 29 to the transmitter. Specifically, it applies the verification signal to the verification receiver circuit 31 located at the transmitter. The verification signal receiver 31 therefore can have at its output the correct verification signal $Qr$, the incorrect verification signal $Qf$, or the conditional verification signal $Qb$.

The conditional signal $Qb$ results when the verification signal received at the verification receiver 31 cannot be clearly recognized as a correct or an incorrect verification signal. Such conditional verification signals are received, for example, if the transmission of the verification signal, $Qr$ or $Qf$, has been distorted in some way during its transmission back through the channel 29.

The verification signals that have been developed by the decision circuit 26 depend on the check signals that have been transmitted with the data bits transmitted between the transmitter and receiver of FIG. 1. If the check signals have been correctly transmitted, then the decision circuit 26 produces the correct verificatiin signal $Qr$. If the check signals received at the decision circuit 26 have been incorrectly transmitted or distorted in some way, then the decision circuit 26 will produce a verification signal $Qf$ indicating incorrect verification.

If the verification signal received at the transmitter control circuit 17 is the signal $Qr$, this circuit permits the transmission of data to continue undisturbed. However, if the verification signal received at the circuit 17 is either the signal $Qf$ or $Qb$, then the transmitter control circuit 17 arranges for the data previously sent to the receiver to be transmitted once again. This is accomplished as explained below.

Figure 2A:
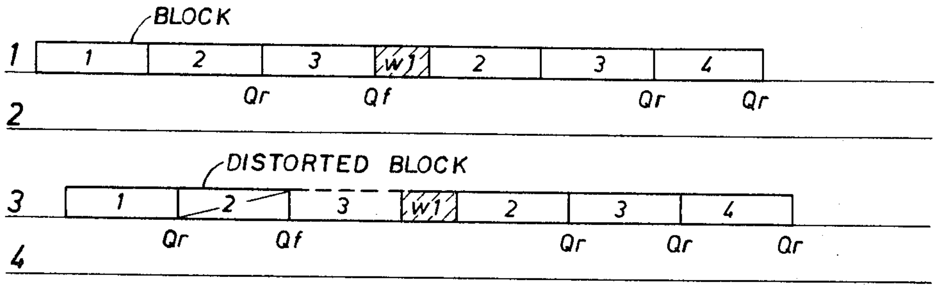
FIGS. 2A, 2B and 2C are graphical representations showing the time relationship between the signals in the transmitter and receiver portions of the data transmission system of FIG. 1.

Referring now to FIG. 2A, lines 1 and 2 of this figure indicate the signals at the transmitter while lines 3 and 4 indicate the signals at the receiver. On line 1, it can be seen that three blocks 1, 2 and 3, are transmitted without incident. On line 3, it can be seen that block 1 has been received and a verification signal $Qr$ has been generated. This indicates that the data in block 1 has been correctly received by the receiver and block 1 has been passed into the data sink 24.

However, the data in block 2, as indicated by the check signals transmitted with the data signals have become distorted or otherwise incorrectly received at the receiver. Thus, the incorrect verification signal $Qf$ is generated at the receiver and transmitted back to the transmitter. It should be noted, from the time relationship of FIG. 2A, that the generation of the incorrect verification signal $Qf$ occurs after the transmission of the third block of data information has already been initiated in the transmitter. Thus, the verification signal $Qf$ becomes effective at the transmitter only at the end of the transmission of the data in block 3.

When the transmitter control circuit 17 receives the verification signal $Qf$, if applies a signal on conductor 32 to a signal generator 33. The signal generator 33 generates a repetition signal W1 which is applied to the modulator 16 and transmitted to the receiver. Such signal W1 is shown as transmitted in FIG. 2A, line 1 occurring immediately after completion of data block 3. This signal is received in the receiver, therefore, after the block 3 has already been received in the receiver. Following the transmission of the repetition signal W1, the data in the incorrectly received block 2 is retransmitted as are all the data in the blocks that follow. Thus, on line 1 of FIG. 2A, blocks 2, 3 and 4 are shown being transmitted following the transmission of the repetition signal W1.

When the repetition signal W is received in the receiver, the signal recognition gate 34 responds thereto and applies an output to the receiver control circuit 27 to normalize its operation. That is, when the incorrect verification signal $Qf$ is generated in the decision circuit 26, this is applied to the receiver control circuit 27. At this time, the receiver control circuit 27 controls the switches 19 and 23 so that no data is transmitted to the data sink 24. However, when the repetition signal W1 has been picked up by the recognition gate 34, it will signal the receiver circuit 27 so that it will permit the transmission of data to the data sink 24 after the reception of the repetition signal W1.

It can be seen in FIG. 2A, line 3, that blocks 2 and 3 corresponding to the distorted data block 2 and the block following data block 2 have not been transmitted to the data sink 24. However, after the reception of the repetition signal W1 at the receiver the remaining transmitted information is applied to the data sink 24. Of course, it should be noted that the newly received blocks 2, 3 and 4 in the receiver have all given rise to correct verification signal Q*r*.

In the above operation, the transmitting period for a block of information is long enough so that it permits the development of a verification signal and the transmission of such signal back to the transmitter before the next block of information has been completely transmitted.

Figure 2B:
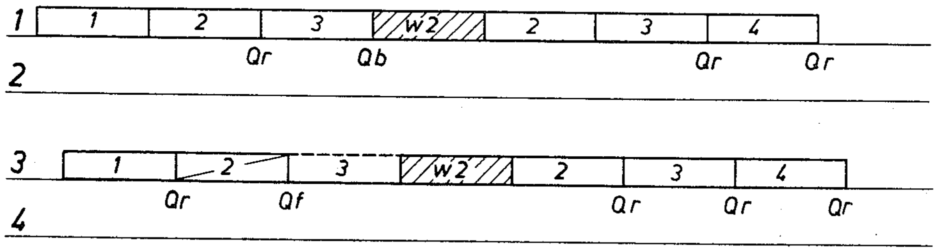

In the event the transmitter control circuit 17 receives a condition verification signal Q*b* from the verification signal receiver 31, the operation is somewhat different. Under these conditions, the transmitter control circuit 17 applies a signal on conductor 34 to a second signal generator 36. The generator 36 generates a repetition signal W2 which is shown in FIG. 2B, line 1. This repetition signal W2 is applied to the modulator 16 and received at the receiver from the demodulator 18. A recognition gate 37 in the receiver responds to the repetition signal W2 and applies an output to the receiver control circuit 27.

It should be appreciated that two conditions can exist in the receiver at this time. The conditional signal Q*b* could result from a distortion of either a correct verification signal Q*r* or an incorrect verification signal Q*f*. In FIG. 2B is demonstrated the conditional signal Q*b* resulting from a distortion of an incorrect verification signal Q*f*. Thus, it can be seen in line 3 of FIG. 2B, the incorrect verification signal Q*f* is generated after the receipt of the distorted information block 2.

However, the signal received at the transmitter as shown at line 1 of FIG. 2B is the conditional signal Q*b*. This results in the generation of a repetition signal W2 in the transmitter, as mentioned above. In such case, since the receiver has generated an incorrect verification signal Q*f*, it is anticipating a repetition signal and the receipt of the repetition signal W2 by the recognition gate 37 will effect the operation of the receiver in the same manner as the receipt of the repetition signal W1 by the recognition gate 34. Thus, the data blocks 2, 3, and 4 will be transmitted and received and applied to data sink 24 in the receiver. The originally transmitted blocks 2 and 3 have been suppressed and not passed to data sink 24.

Figure 2C:
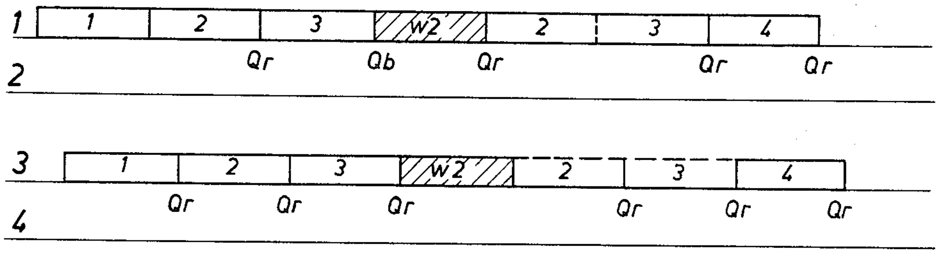

In the second case, however, when the conditional signal Q*b* received at the transmitter is a distorted correct verification signal Q*r*, the results are somewhat different. In the transmitter, as can be seen in FIG. 2C, line 1, the conditional signal Q*b* is applied at the end of the data block 3 and results in the generation of the repetition signal W2. However, in this instance, the receiver is not anticipating the receipt of a repetition signal. That is, the receiver has generated the correct verification signal Q*r* and thus the data transmitted after the data block 2 has already been transmitted to the data sink 24 directly. This can be seen on line 3 of FIG. 2C. Thus, the combination of the repetition signal W2 and the correct verification signal Q*r* in the receiver control circuit 27 will cause the circuit 27 to maintain the switches 19 and 23 in neutral condition so that the two blocks following the repetition signal W2 are not applied to the data sink 24. This illustrated by the dotted lines in the data blocks 2 and 3 on line 3 of FIG. 2C following the receipt of the repetition signal W2 in the receiver. When the data block 4 is received in the receiver, it is applied to the data sink 24, as it should be. It should be noted that the result on line 3 of FIG. 2C is the application of the data blocks 1, 2, 3, and 4 to the data sink 24.

When the conditional verification signal Q*b* corresponds to a distorted correct verification signal Q*r*, some steps have to be taken in the transmitter to render the next following correct verification signal Q*r* ineffective. This may be accomplished by making the repetition signal W2 so long that the next received verification signal is received at the transmitter during the time that the repetition signal W2 is still being transmitted. This will prevent the verification signal from being effective in the transmitter.

In the above embodiment, W1 is shorter than W2. Thus the response time of the system is very quick for an incorrect verification signal Q*f*. It only generates signal W2 when the verification has been distorted, during its return transmission to the transmitter.

Figure 3:
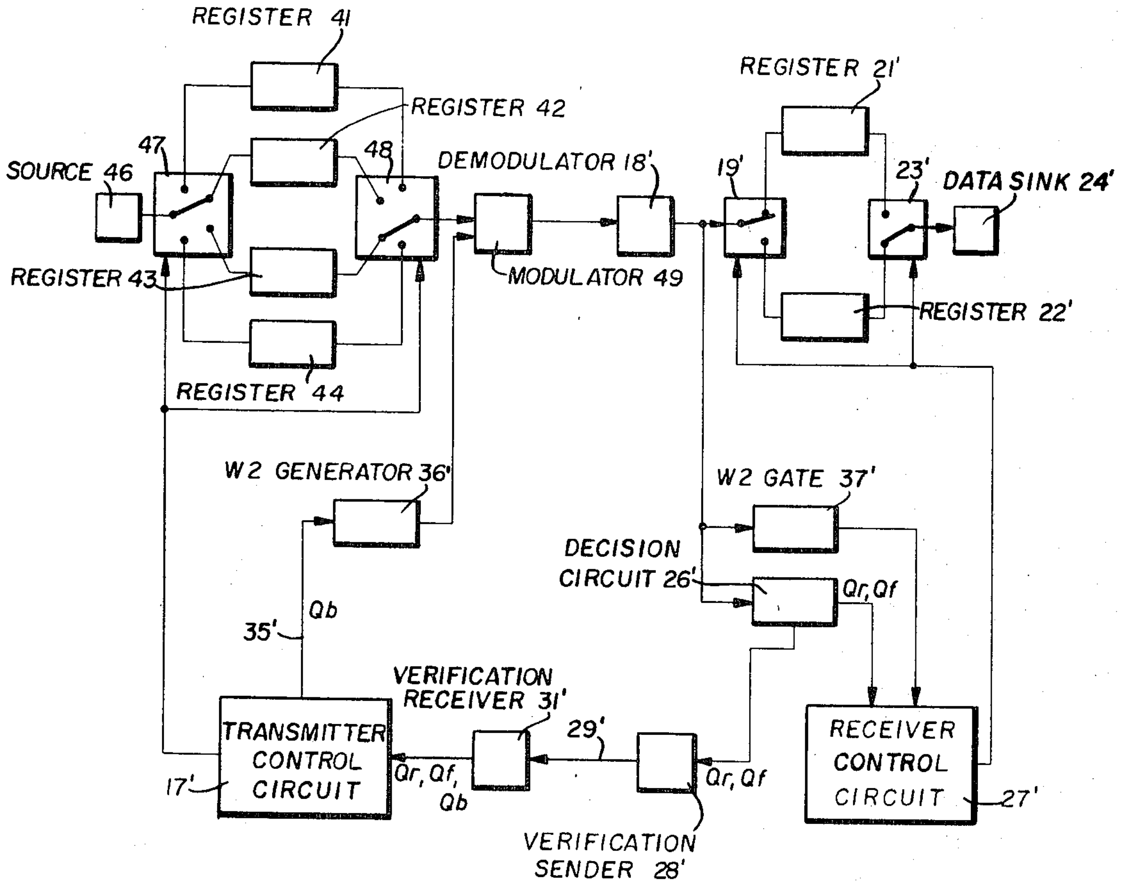
FIG. 3 is a block diagram of a second embodiment of a data transmission system incorporating the principles of the present invention.

Referring now to FIGS. 3 and 4, a second embodiment incorporating the principles of the present invention will be described. It can be seen that the transmitter portion of FIG. 3 includes four registers 41, 42, 43 and 44. Thus, in FIG. 3 there is an *n*-register system wherein *n* equals 4. This system is described in the German Auslegeschrift No. 1,202,311.

In the arrangement of FIG. 3, the binary data information proceeds from the source 46 through the four position switch 47 selectively to each of the registers 41 to 44. A block of data is stored in each such register prior to transmission through the output switch 48 to the modulator 49. The switch 48 is also a four-position switch. The receiving side of the system in FIG. 3 is substantially identical to the arrangement of FIG. 1 and accordingly these elements have been identified with identical numbers primed.

In the operation of the system of FIG. 3, since four blocks of data are transmitted for each cycle of the switches 47 and 48, it is necessary to repeat four data blocks starting with the block which has given rise to the incorrect verification signal Q*f*.

Figure 4A:
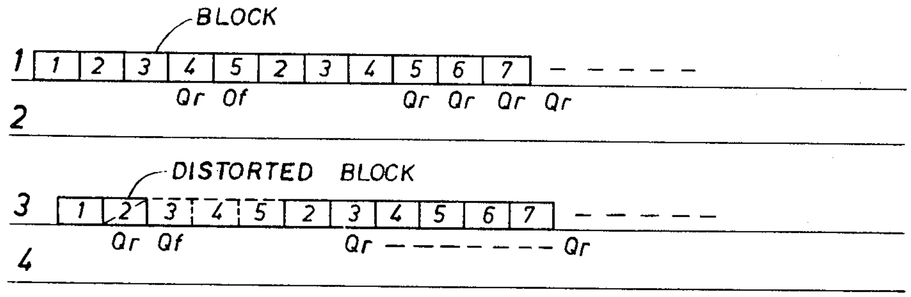
FIGS. 4A, 4B and 4C are graphical representations showing the time relationship between the transmitted and received signals of the arrangement of FIG. 3.

This can best be seen by reference to the time diagram FIG. 4A. The block 1 on line 1 is transmitted to the receiving member and on line 3 it is seen that the correct verification signal Q*r* is developed from the decision circuit 26′. The data block 2, however, arrived at the receiving side of the system as shown on line 3 as a distorted block. This causes the circuit 26′ to develop the incorrect verification signal Q*f* which is applied to the receiver control memebr 27′ and to the verification sender 28′.

The incorrect verification signal Q*f* is transmitted back to the transmitter portion of the system by means of the channel 29′ to the verification receiver 31′. The verification signal Q*f* is applied to the transmitter control member 17′ which maintains switch 47 in a neutral position and recycles switch 48 so that the four data blocks stored in registers 41 to 44 are again transmitted to the receiver. It can be seen that the timing is such in FIG. 4A that the verification signal Q*f* is received at the transmitter at about the same time that block 5 is being transmitted. This is the third block after the distorted block of information has been received. Thus, the transmitter will start retransmitting the next stored block of information which is block 2 and will repeat the transmission of blocks 2, 3, 4 and 5.

The incorrect verification signal Q*f* which was applied to the receiver control circuit 27′ causes this member to operate its switches 19′ and 23′ into the neutral position so that no data is transmitted ti the data sink 24′ for the next three blocks of information following the receipt of the distorted block of information 2 and the generation of the incorrect verification signal Q*f*. In FIG. 4A, line 3, it can be seen that data blocks 2, 3, 4, and 5 are suppressed and not transmitted to the data sink 24′. However, the retransmitted block 2 is the fourth block after the distorted block has been received. This passes to the data sink 24'.

The advantage of the above arrangement is that no repetition signal equivalent to the signal W1 of FIG. 1 is required for the arrangement of FIG. 3. That is, the normal cycle of the transmitter in the system of FIG. 3 is a four-stage cycle so that four blocks of information are transmitted for each cycle. As can be seen from the above description, the receiver and the transmitter can cooperate to respond to the generation of the incorrect verification signal $Qf$ and retransmit the correct blocks of information while the receiver will suppress the blocks of information that it receives during the time the incorrect verification signal $Qf$ is sent back to the transmitter.

It should, of course, be pointed out that, when the correct verification signals $Qr$ are received, the transmitter and receiver continue with their normal operation. This can be seen in FIG. 4A, line 3, wherein blocks 3 to 7, etc. have all been received at the receiver with the correct check signal information.

If a conditional verification signal $Qb$ is received back at the transmitter control 17', this member applies such signal on the conductor 35' to the generator 36' for generating a repetition signal W2. The repetition signal W2 is applied to the modulator 49 and back to the receiving portion of the system in the same manner as the system shown in FIG. 1.

Figure 4B:
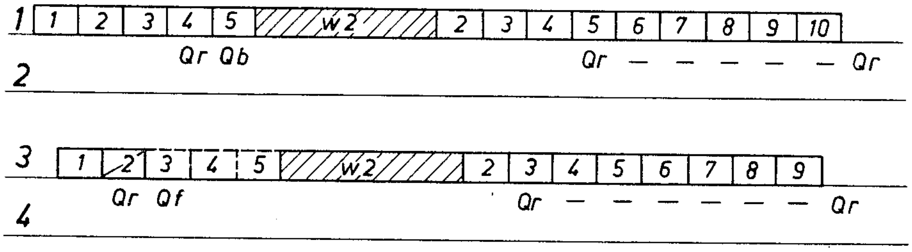

In the receiver, the recognition gate 37' responds to the receipt of the repetition signal W2 and alerts the receiver control circuit 27'. It can be seen that the repetition signal W2 is longer than four blocks of data being transmitted. This permits the proper cycling of the apparatus to be completed and the repeated cycle to follow the repetition signal. Thus, in FIG. 4B, the conditional verification signal $Qb$ has resulted from a transmission distortion of an incorrect verification signal $Qf$ which developed from the distorted data block 2 as received in the receiver. Since the incorrect verification signal $Qf$ has been generated in the receiver, line 3, of FIG. 4B shows that the next three blocks of data 3,4 and 5 following the distorted block are suppressed and not applied to the data sink 24'.

When the repetition signal W2 arrives at the receiver, it is followed by the retransmitted blocks 2, 3, 4 and 5. Now, the receiver applies these retransmitted blocks 2, 3, 4 and 5 to the memory 24'. As further shown in lines 1 and 3 of FIG. 4, the remaining data blocks 6 to 9 are correctly received at the receiver and no further repetition signals are necessary.

Figure 4C:
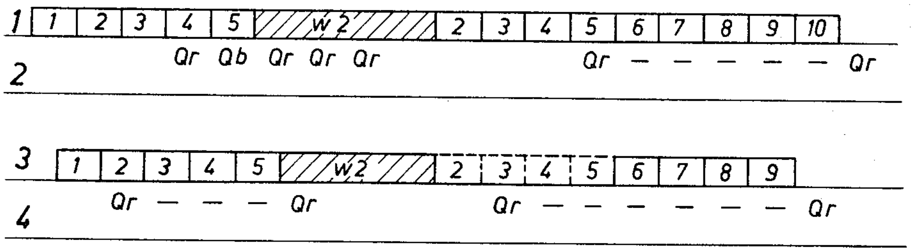

In the circumstances illustrated in FIG. 4C, the conditional signal $Qb$ that has arrived at the transmitter was due to a distorted correct verification signal $Qr$. As before, the transmtiter applies the conditional signal $Qb$ on the conductor 35' to the generator 36' and the data being transmitted is repeated so that blocks 2, 3, 4 and 5 are again transmitted at the end of the repetition signal W2.

In the receiver, however, the blocks 2, 3, 4 and 5, have already been received and applied to the data sink 24'. That is, in the conditions outlined in FIG. 4C, only the correct verification signals $Qr$ have been developed. Now, when the repetition signal W2 is responded to by the recognition gate 37' and applied to the receiver control circuit 27', the receiver control circuit operates to suppress or prevent the data blocks transmitted after the repetition signal W2 from reaching the data sink 24'. Thus, as shown in line 3 of FIG. 4C retransmitted data blocks 2, 3, 4 and 5 are not permitted to reach the memory 24'. It should be noted that these blocks have already been applied to the data sink prior to the receipt of the repetition signal W2.

It can be seen from the above that with an $n$-register unit in the transmitter, it is possible to develop repeated transmission information by using only one repetition signal responding to the conditional verification signals rather than the arrangement shown in FIG. 1.

Figure 5:
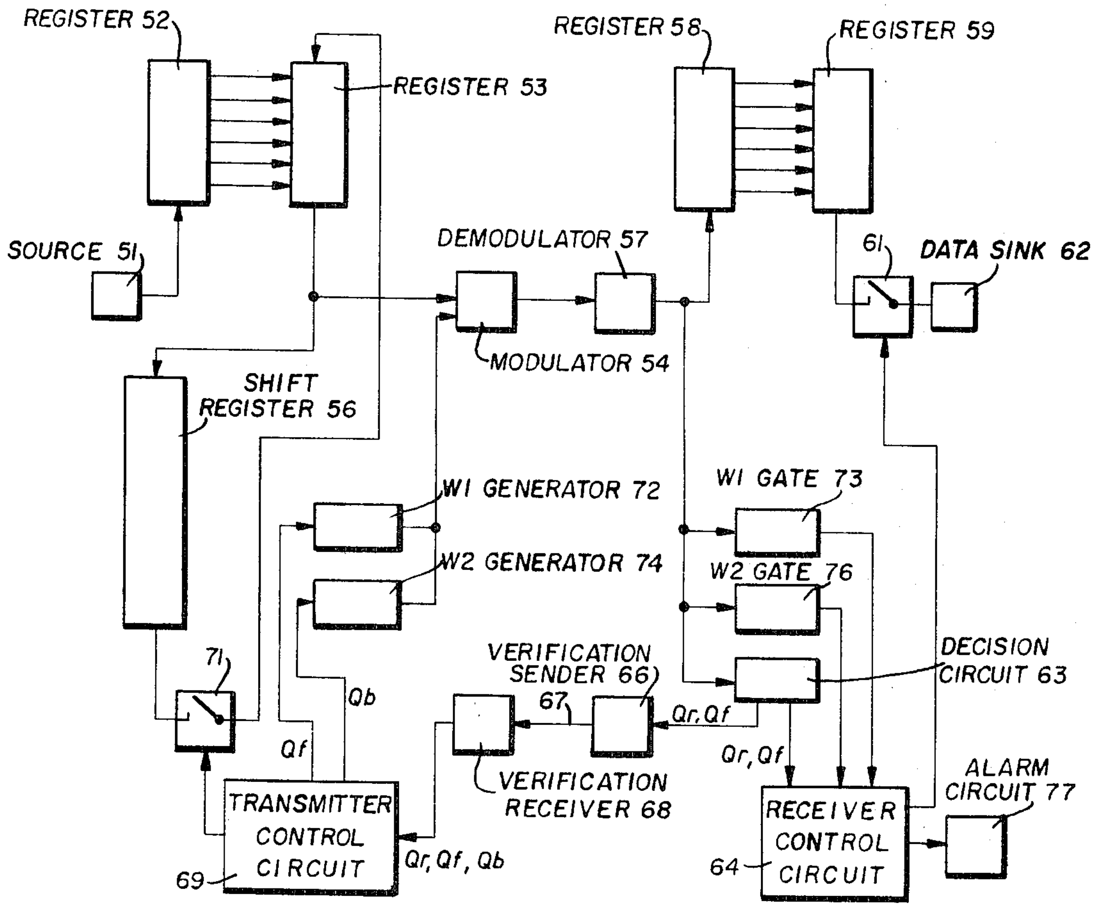
FIG. 5 is a block diagram of a third embodiment incorporating the principles of the present invention.
Figure 6A:
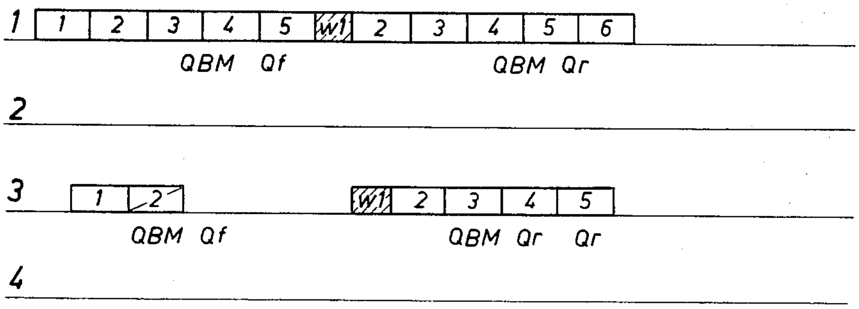
FIGS. 6A, 6B and 6C are graphical representations showing the time relationship between the signals in the system of FIG. 5.
Figure 6B:
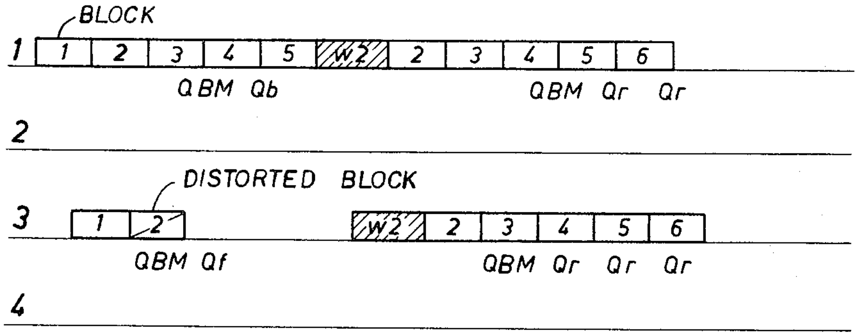
Figure 6C:
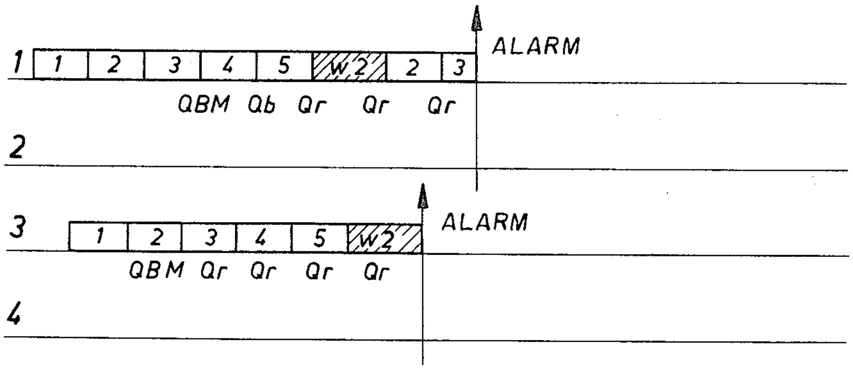

Referring now to FIGS. 5 and 6, a third embodiment incorporating the principles of the present invention is illustrated. In the data transmission system of FIG. 5, the time between the transmission of a block of information and the receipt at the transmitter of a verification for this block is utilized. One such transit time system is described in the German published patent application (Auslegeschrift) No. 1,207,425.

In FIG. 5, the data blocks are transmitted from the source 51 to the register 52 and from there in parallel to the register 53. From the register 53, the data is transmitted in serial form to the modulator 54 for transmission to the receiver. The data from the storage member 53 is also serially transmitted to the transit time controlled shift register 56.

At the receiving side, the modulated data block is demodulated in the demodulator 57 and applied to the register 58 in series. After the message has been checked for errors, the data is then transmitted in parallel fashion to the register 59 from which it is applied to the switch 61, when it is in closed position, to the data sink 62.

In the receiver, for each block of information received, the decision circuit 63 develops a verification signal which is applied to the transmitter control circuit 64 and to the verification sender 66. The verification sender 66 transmits the verification signals to the transmitter side of the system along the channel 67 and is received by the verification receiver 68. For the first verification signal after the beginning of transmission, the verification sender 66 sends a preselected verification beginning signal QBM. This verification beginning signal is also sent by the verification sender after the receipt of an expected repetition of data transmission.

At the transmitting end, the receipt of the verification beginning signal QBM at the transmitter control circuit 69 indicates to this control circuit that the next repetition of data should be taken from the transit time shift register 56.

In operation, as shown in FIG. 6A, lines 1 and 3, the data block 1 is transmitted and received by the receiver side of the system correctly. Thus, the first verification signal is the verification beginning signal QBM. The next block of data 2 transmitted to the receiving side is received in the receiver in distorted form. Thus, the decision circuit 63 in the receiver develops an incorrect verification signal $Qf$ which is applied to the control circuit 64 and the verification sender 66. The control circuit 64 immediately opens the switch 61 to prevent any data from the register 59 from reaching the data sink 62.

When the verification signal $Qf$ reaches the control circuit 69 in the transmitter portion of the system, this indicates that a repetition of transmission of data must be accomplished. The control circuit 69 closes the switch 71 which causes the register 53 and the transit time shift register 56 to be arranged in a ring circuit. The repetition of transmission of data is accomplished by the cyclical displacement of data in the ring until all of the information which has not been verified as correct by the receiver is retransmitted. That is, it can be seen that the data will cycle bit by bit in serial form between the register 53 and received in the receiver. The recognition gate 73 in modulator 54 for the repetition of data transmission.

Before the repetition of data transmission is initiated at the transmitter, the control circuit 69 applies a signal to the generator 72 for generating the repetition signal W1. This repetition signal is applied to the modulator 54 and received in the receiver. The recognition gate 73 in the receiver responds to the repetition signal W1 and applies such indication to the receiver control circuit 64. After receipt of the repetition signal W1 at the receiver control circuit 64, the switch 61 is closed so that the data now being retransmitted by the transmitter will be applied to the data sink 62.

The above-described operation is evident from FIG. 6A, lines 1 and 3, wherein it is seen that on line 3, after the generation of the incorrect verification signal Q*f*, no data reaches the data sink 62 and after the reception of the repetition signal W1, the data blocks 2, 3, 4 and 5 are again transmitted to the data sink 62. It should be noted on line 3 of FIG. 6A that, after the correct receipt of the data block 2, which is the first data block after the occurrence of the repetition signal W1, the verification sender 66 transmits a new verification beginning signal QBM back to the transmitter.

The above operation is substantially identical when a conditional signal is received at the transmitter corresponding to an incorrect verification signal Q*f* which has been distorted by transmission through the channel 67. That is, the verification signal Q*b* causes the transmitter control circuit 69 to generate a repetition signal W2 by application of a signal to the generator 74. At the same time, the switch 71 is closed so that the data is retransmitted. This arrangement is illustrated in FIG. 6B, lines 1 and 3, where it is seen that the data blocks 2, 3, 4 and 5 are retransmitted after the generation of the repetition signal W2. At the receiver end, the W2 recognition gate 76 responds to the repetition signal W2 and operates the receiver control circuit 64 in the same manner as the recognition gate 73.

However, if the conditional signal Q*b* that has been received at the transmitter control circuit 69 actually corresponds to a distorted correct verification signal Q*r*, the transmitter circuit again generates the repetition signal W2 as before. However, under these circumstances, when the repetition signal W2 is responded to by the recognition gate 76, it causes the receiver control circuit 64 to operate an alarm circuit 77. The alarm circuit will cause the transmission and reception of the data in the data transmission system to be halted. This is due to the fact that in a transit time control system it is very difficult to prevent retransmitted data from reaching the data sink 62 when the retransmitted data is due to the distortion of a correct verification signal. It is thus simpler in such a case to stop the transmission of data than to attempt to correct the errors.

The transmitter receives additional correct verification signals Q*r* after the conditional signal Q*b* has been received. Since the receiver does not generate the verification beginning signal QBM, the transmitter control circuit 69 recognizes that the repetition initiated by the receipt of the conditional signal Q*b* was incorrect and not required by the receiver. It will therefore suppress the repetition of data that has already been sent and it will not close the switch 71. After the error in the backward transmission channel has been repaired the new verification beginning signal QBM will again be generated by the verification sender 66.

It can be appreciated from the above that the reception of a conditional verification signal at the verification receiver located at the transmitter portion of the transmission system poses a problem for the transmitter. If the conditional verification is actually an incorrect verification signal, then the distorted block of information corresponding to the incorrect verification signal should be retransmitted. However, if the conditional verification is a distorted correct verification signal, the repetition of the transmitted data will be wasted. With the above-described systems, the decision is actually controlled by the receiver. A clearly false verification signal Q*f* received back at the transmitter either results in a very short repetition control signal W1 such as indicated in FIGS. 2 and 6 or it will result in no repetition signal at all such as in the system of FIG. 4.

The reception of a conditional verification signal Q*b* at the transmitter produces a repetition signal W2 which is longer than the repetition signal W1. This permits the receiver to make the decision to either pass the newly retransmitted information to the data sink or to suppress the information received after the W2 signal. That is, if the W2 signal is received at the receiver corresponding to a correct verification Q*r*, then the receiver suppresses the retransmitted information and does not permit the same to reach the memory. This avoids the double storage of the same information.

If the W2 signal received at the receiver is the result of an incorrect verification signal Q*f* generated at the receiver, then the receiver treats the retransmitted information as new information and admits it to pass to the data sink.

The above-described advantageous method and apparatus incorporating the principles of the present invention has the great advantage that the additional time for protection of the verification signals is taken only if the verification signals are actually distorted during the backward transmission from the receiver to the transmitter. As pointed out above, if the verification signal is not distorted and is clearly an incorrect vertification signal Q*f*, then a shorter time is taken for the retransmission of the information. Thus the advantages of the present systems are clear. For correctly transmitted verification signals, the system takes no more time than ordinary systems. For distorted verification signals, the system and method take a little more time but permit the receiver to make the decision whether to store or suppress newly transmitted information without requiring highly redundant additional check signals which take up substantial portions of the channel normally available for transmission purposes.

The repetition signal W1 corresponding to an incorrect verification signal is used for synchronizing the information receiver for the expected repetition. Thus, it is sufficient that this signal W1 has a low degree of redundancy. The repetition signal W1 can, for example, be a starting pulse or have a very low redundant bit configuration. Such signal need not even be used if the data transmission system has a fixed synchronization for the transmission of blocks of information between the sending and receiving end. Such an arrangement is shown in FIGS. 3 and 4, for example, where the W1 signal is not necessary.

It should be clear that, if the retransmitted information is again incorrectly received, a new incorrect verification signal will be generated at the receiver and transmitted back to the transmitter. This will initiate a new cycle of repetition of information transmission until correct verification signals are received.

The verification signals for correct and incorrect verifications should be quite easily distinguishable so that the conditional signals should occur at the verification receiver as seldom as possible. Thus, one way of providing such different signals is to have each of the individual bits of a correct verification signal be completely inverted for an incorrect verification signal. That is, the verification signal will be the exact opposite for incorrect and correct verifications. In such a case, an incorrect verification signal can be received in the verification receiver at the transmitter as a correct verification signal only if all of the bits of information in the signal are inverted by distortion when being transmitted from the receiver back to the transmitter.

For further protection of the check signals, it is useful if a check signal which is transmitted $n$ times is considered completely received only if, after the first check signal is received, at least some preselected number $k$, less than $n$ additional check signals are also received.

A further possibility exists for differentiating between correct and incorrect reception of transmitted information wherein the absence of the check signals will indicate incorrect reception. Similarly, the absence of check signals can indicate correct reception. For such an arrangement, it is desirable that systems using such a method have a very low probability of loss of a check signal by means of distortion in the transmission channel.

In such cases, it may be preferable to have a plurality of verifications which follow each other and are correlated with each other so that the first absence of the check signal is not used but rather the absence of preselected number of check signals will determine either the correct or incorrect reception of data.

For additional protection of the check signals, it is possible to separate the check signal into at least two groups. In such cases, the check signals will be considered fully recognized or received only when a preselected number of groups are received. In this way, the check signal groups can be partially split up so that at least some individual signals of one group can correspond simultaneously to individual signals of the next following group. Even under such conditions, it is possible that the control signals with the higher signal strength will be transmitted without distortion while the control signals with the lower signal strength will be more susceptible to distortion.

The information signals and the check signals can be at least partially differentiated from each other by using different modulation methods and/or means for additive mixing. In this way, correct and incorrect verification signals may be transmitted with different types of modulation. If the check signals are received at the receiver side of the transmission system only in preselected time intervals, then additional protection against the distortion of the check signals through the transmission channel is provided.

In the preceding description the function of the various blocks is explained. In the following section the construction of these blocks is described as far as necessary and the bracketed numerals refer to the references hereafter listed.

(1) DATA SOURCE

Data sources are devices to deliver information, such as apparatus reading binary information out of data storages, e.g. punched-tape emitters, punched-card readers, magnetic tape readers, further output channels of computers. The output channels of computers, such as shift rgisters discussed under point 3 below are particularly favored.

(2) DATA SINK

Output devices are devices to receive information for storage or further evaluation. Storage devices are such as punched-tape receivers, punched-card receivers, magnetic tape recorders and so on. Blocks for further evaluation are such as input channels of computers. Electro-optical indicators, such as symbol indicating tubes, too, may be output devices. As data sinks computer input channels are preferred, which again are provided as shift registers.

(3) REGISTER

The electronics of the intermediate storage consist of a shift register that is to receive the bits delivered by the data source. Transistor flip-flop shift registers are described, e.g. in [1], chapters 2 and 5; [3]; and [4], page 413 in connection with page 140 et seq.

(4) SWITCHES

All switches are electronic diode-logic switches, such as AND-circuits are described e.g. in [3], pages 36–62, particularly page 39, FIG. 2–2, and [4].

(5) TRANSMITTER AND RECEIVER CONTROL CIRCUIT

The electronic control device consists of known circuit components, combined in such a manner that the functional cooperation of the electronic control device will be assured. Therefore, it contains bistable and monostable flip-flops and logic circuits, such as AND- and OR-circuits. In general, the electronic control device is a sequential control switch device as described e.g. in [1], [3], [4], [8], [9], [10], [6], [7].

(6) MODULATOR DEMODULATOR

In the modulator the binary information is modulated upon a carrier-voltage. In the demodulator the information is regenerated from the carrier-voltage received, e.g. [5].

(7) W1- and W2-GENERATORS

W1-, W2-Generators generate special groups of information. In general for this purpose feedback-shift registers are used such as described in [2] on p. 116, FIG. 7.12, p. 118, FIG. 7.14, and page 121, FIG. 7.15.

(8) GATES

The gates consist of diode-logics as described in [8], [9], [10], [11]. For example see [10], pages 330, 331.

(9) DECISION CIRCUITS

Decision circuits are shift registers with diode-logics, which are described in [2], where they are used as decoders. A description of one may be found in [2], page 191, FIG. 10.1.

(10) VERIFICATION RECEIVER

It contains a demodular and a decision circuit mentioned in points 5 and 8 above. Such circuits are described in [12].

(11) ALARM CIRCUIT

The alarm circuit is a device which gives an optical or acoustical signal, when a not correctable error appears.

REFERENCES

[1] A. I. Pressman:
Design of Transistorized Circuits for Digital Computers.
New York, 1959.
[2] W. W. Peterson:
Error Correcting Codes.
New York, London, 1961.
[3] R. Richards:
Digital Computer Components and Circuits.
New York, 1957.
[4] Millman and Taub:
Pulse and Digital Circuits.
New York, 1956.
[5] CCITT Com.
Sp. A. No. 75–E (i.e. International Telephone and Telegraph Consultative Committee's Special Study Group A., Contribution No. 75–E).
[6] J. P. Costas:
Synchronous Communications.
Proc. IRE (1956), pp. 1713–1718.
[7] Edson et al.:
Synchronized Clocks for Data Transmission.
Electronics No. 40 (January 1959), S. 832–836.
[8] R. Richards:
Arithmetic Operations in Digital Computers.
New York, 1955.
[9] M. Phister, Jr.:
Logical Design of Digital Computers.
New York, 1958.
[10] S. H. Caldwell:
Switching Circuits and Logical Design.
New York, 1958.
[11] S. E. Gluck et al.:
The Design of Logical Or- And- Or Pyramids for Digital Computers.
Proc. IRE, Vol. 4½ (1953), pp. 1388–1392.
[12] CCITT Com. Sp. A. No. 92–E of Oct. 18, 1963, p. 52.

It will be understood that the above description of the present invention is susceptible to various modifications, changes and adaptations, and the same are intended to be comprehended within the meaning and range of equivalents of the appended claims.

What is claimed is:

1. In a method of transmission of data from a transmitter to a receiver, the steps of:
 (a) transmitting data in the form of information signals together with adjacent check signals to the receiver;
 (b) generating verification signals at the receiver in the form of a correct verification signal when said check signals have been correctly received and in the form of an incorrect verification signal when said check signals have been incorrectly received;
 (c) transmitting said verification signal back to said transmitter whereby said transmitter transmits new data in response to a correct verification signal;
 (d) retransmitting, at said transmitter, selected portions of said previously transmitted data in response to an incorrect verification signal;
 (e) generating, at said transmitter, a first repetition signal having a high redundancy and retransmitting said selected portions of data in response to a conditional verification signal corresponding neither to said correct nor to said incorrect verification signals;
 (f) generating, at said transmitter, a second repetition signal having a low redundancy in response to an incorrect verification signal prior to its retransmission of data;
 (g) storing at said receiver repetition signals containing said low redundancy; and
 (h) storing or suppressing at said receiver repetition signals containing said high redundancy in dependence on whether the initial signal was incorrectly or correctly received.

2. A method as defined in claim 1 wherein said check signals include a plurality of individual signals.

3. A method as defined in claim 1 wherein all of the bits of said correct verification signal are opposite in meaning respectively to all of the bits of said incorrect verification signals.

4. A method as defined in claim 1 wherein a check signal is considered correctly received when a preselected number of check signals appear in series.

5. A method as defined in claim 1 wherein a correct verification signal is transmitted by the receiver only when the correct check signals have been received and wherein the absence of such correct verification signal indicates an incorrect reception.

6. A method as defined in claim 1 wherein the absence of a preselected number of check signals which follow each other in series indicates the incorrect reception of data at said receiver.

7. A method as defined in claim 1 wherein a check signal is distributed into at least two different groups prior to transmission and wherein said receiver generates a correct verification signal when a preselected number of groups have been received.

8. A method as defined in claim 7 wherein the check signal groups partially overlap each other so that at least an individual signal in one group is simultaneously related to an individual signal of the next following group.

9. A method as defined in claim 1 wherein the check signals are transmitted with higher signal strength than said information signals.

10. A method as defined in claim 1 wherein said information signals and said check signals are at least partially differentiated from each other by different types of modulations and/or additive mixings with respect to one another.

11. A method as defined in claim 1 wherein said check signals are received at the receiver only during preselected time intervals.

12. In a system for transmitting data from a transmitter to a receiver, the combination which comprises:
 (a) means for transmitting data in the form of information signals together with adjacent check signals to the receiver;
 (b) means for generating verification signals at the receiver in the form of a correct verification signal when said check signals have been correctly received and in the form of an incorrect verification signal when said check signals have been incorrectly received;
 (c) means for transmitting said verification signal back to said transmitter;
 (d) means in said transmitter for transmitting new data in response to a correct verification signal;
 (e) means in said transmitter for retransmitting selected portions of said previously transmitted data in response to an incorrect verification signal;
 (f) means in said transmitter for generating a first repetition signal having a high redundancy and retransmitting said selected portions of data in response to a conditional verification signal corresponding neither to said correct nor to said incorrect verification signals;
 (g) means in said transmitter for generating a second repetition signal having a low redundancy in response to an incorrect verification signal prior to its retransmission of data;
 (h) means in said receiver responsive to repetition signals containing low redundancy for registering data retransmitted by said transmitter in response to an incorrect verification signal;
 (i) decision means in said receiver responsive to repetition signals containing high redundancy for preventing registration of data at said receiver retransmited by said transmitter in response to a conditional verification signal which is a signal of a first special form and for registering data retransmitted by said transmitter in response to a conditional verification signal which is a signal of a second special form different from said first special form.

13. A method as defined in claim 1 wherein said data is transmitted in the form of binary signals.

14. The combination defined in claim 12 wherein said data is transmitted in the form of binary signals.

15. The combination defined in claim 14 wherein said data is transmitted in the form of blocks of signals.

16. A method as defined in claim 13 wherein said data is transmitted in the form of blocks of signals.

17. The combination defined in claim 12 wherein said decision means acts in response to a conditional verification signal of a first special form which is a distorted correct verification signal.

18. The combination defined in claim 12 wherein said decision means acts in response to a conditional verification signal of a second special form which is a distorted incorrect verification signal.

19. The combination defined in claim 12 wherein said decision means acts in response to a conditional verification signal of a first special form which is a distorted correct verification signal and a conditional verification signal of a second special form which is a distorted incorrect verification signal.

References Cited

UNITED STATES PATENTS 3,388,378 6/1968 Steeneck et al. ________ 340—146.1

EUGENE G. BOTZ, Primary Examiner

R. S. DILDINE, Jr., Assistant Examiner